United States Patent [19]
Soudijn et al.

[11] 3,843,635
[45] Oct. 22, 1974

[54] [(THIOXANTHENYL)PROPYL]-TRIAZASPIRO[4,5]DECAN-4-ONES

[75] Inventors: Willem Soudijn, Turnhout; Ineke Van Wijngaarden, Beerse; Paul Adrian Jan Janssen, Vosselaar, all of Belgium

[73] Assignee: Janssen Pharmaceutica, N.V., Beerse, Belgium

[22] Filed: Feb. 26, 1973

[21] Appl. No.: 335,846

[52] U.S. Cl. ...... 260/240 TC, 424/267, 260/293.57, 260/293.66
[51] Int. Cl............................................ C07d 29/26
[58] Field of Search .... 260/240 TC, 293.57, 293.66

[56] References Cited
UNITED STATES PATENTS

| | | | |
|---|---|---|---|
| 3,073,847 | 1/1963 | Doebel et al. | 260/328 |
| 3,113,137 | 12/1963 | Schaeren et al. | 260/327 |
| 3,629,267 | 12/1971 | Kaiser et al. | 260/294.8 C |
| 3,723,441 | 3/1973 | Kaiser et al. | 260/293.57 |

FOREIGN PATENTS OR APPLICATIONS

| | | | |
|---|---|---|---|
| 42-24589 | 11/1967 | Japan | 260/243 A |
| 2,163,657 | 7/1972 | Germany | 260/240 TC |

OTHER PUBLICATIONS

Chemical Abstracts, Vol. 69, Abst. No. 67,440m (abst. of Japanese Patent 42-24589 above cited) (1968).
Chemical Abstracts, Vol. 77, Abst. No. 139838n (abst. of German Offen. 2,163,657 pub. July 13, (1972).
Chemical Abstracts, Vol. 70, Abst. No. 77149h (1969) (abst. of Lecolier, Chim. Ther. 1968, 3(3), pp. 193–199.

Primary Examiner—John D. Randolph
Attorney, Agent, or Firm—Salvatore R. Conte

[57] ABSTRACT

The compounds, 1-phenyl-8-[3-(9-thioxanthenyl)-propyl]-1,3,8-triazaspiro[4,5]decan-4-one, and 1-phenyl-8-[3-(thioxanthen-9-ylidene)propyl]-1,3,8-triazaspiro-[4,5]decan-4-one, useful as neuroleptic agents.

3 Claims, No Drawings

[(THIOXANTHENYL)PROPYL]-TRIAZASPIRO[4,5]DECAN-4-ONES

DESCRIPTION OF THE INVENTION

This invention relates to novel triazaspiro [4,5]decan-4-one derivatives, namely, 1-phenyl-8-[3-(9-thioxanthenyl)-propyl]-1,3,8-triazaspiro[4,5]decan-4-one, having the formula:

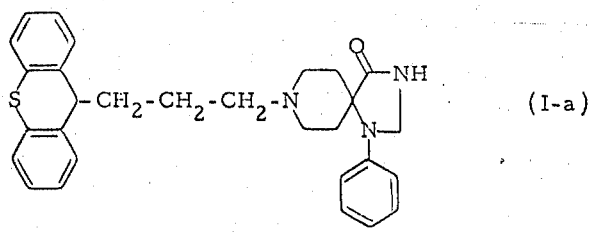

and 1-phenyl-8-[3-(thioxanthen-1-ylidene)propyl]-1,3,8-triazaspiro[4,5]decan-4-one having the formula:

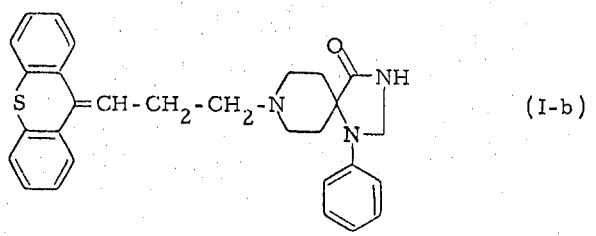

including the therapeutically active non-toxic acid addition salts thereof.

The compounds of formula (I-a) and (I-b) are prepared by reacting the respective derivatives of formulas (II-a) and (II-b), wherein X is a reactive ester of the corresponding alcohol, e.g., chloro, bromo, mesylate, tosylate, and the like, preferably chloro or bromo, with 1-phenyl-1,3,8-triazaspiro[4,5]decan-4-one (III). This condensation reaction is conveniently conducted in an inert organic solvent such as, for example, an aromatic hydrocarbon, e.g., benzene, toluene, xylene and the like; a lower alkanol, e.g., methanol, ethanol, n-butanol and the like; a ketone, e.g., 4-methyl-2-pentanone, butanone, and the like; an ether, e.g., dioxane, diethyl ether and the like; dimethylformamide (DMF); nitrobenzene; and the like. The addition of an acid acceptor, i.e., an appropriate base such as, for example, an alkali metal carbonate or bicarbonate, or an organic tertiary amine such as, for example, a trialkylamine, e.g., triethylamine, tributylamine and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. The presence of catalytic amounts of potassium iodide is also desirable, when X is halo. Elevated temperatures may be employed to enhance the rate of reaction.

The compounds of formula (I-a) and (I-b) may be converted to the therapeutically active non-toxic acid addition salt form by treatment with an appropriate acid, such as, for example, an inorganic acid, such as a hydrohalic acid, e.g., hydrochloric, hydrobromic, and the like, and sulfonic acid, nitric acid, phosphoric acid and the like; or an organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfonic, salicyclic, p-aminosalicyclic and the like acids. Conversely, the salt form can be converted by treatment with alkali into the free base form.

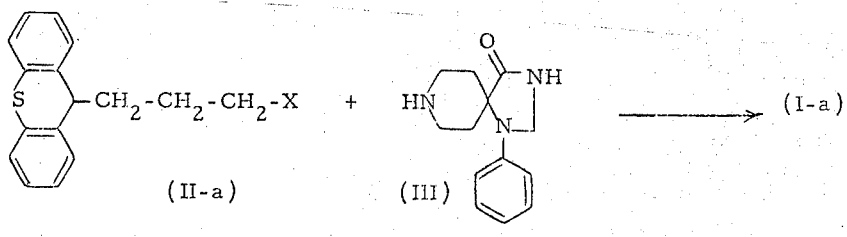

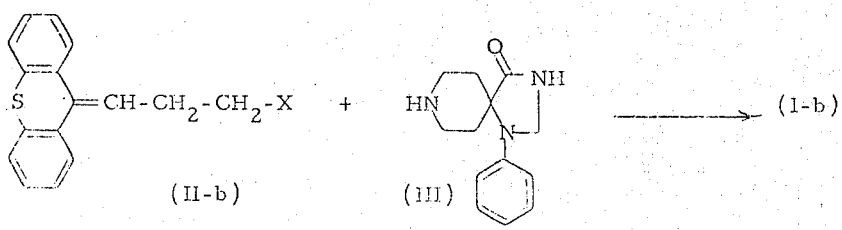

The subject compounds and the therapeutically active acid addition salts thereof have been found to possess central nervous system (CNS) depressant activity similar to the neuroleptic activity of butyrophenones, for example, haloperidol (see U.S. Pat. No. 3.438.991) and of certain triazaspiro[4,5]decan-4-ones, e.g., fluspirilene (see U.S. Pat. No. 3.238.216) and of the 4-aryl-4-hydroxypiperidines in U.S. Pat. No. 3.579.990. Although the subject compounds are qualitatively similar in neuroleptic activity to haloperidol, they differ significantly from the latter in their longer duration of action, similar to said fluspirilene and to said 4-aryl-4-hydroxypiperidines.

Neuroleptic drugs are known to block apomorphine-induced vomiting in dogs. In the anti-apomorphine test [see "Method 1" in Janssen, P. A. J. et al., Arzneim-Forsch., 15, 1196 (1965)], the compound to be tested is given orally followed at different time intervals thereafter by the standard dose of apomorphine (0.31 mg/kg s.c.) which will induce vomiting in untreated dogs. Anti-apomorphine activity is demonstrated with the subject compounds and salts thereof at oral dose levels as low as 0.005 mg/kg and at $ED_{50}$ values of about 0.02–1.0 mg/kg orally. The $ED_{50}$ value (in mg/kg) is the oral dose level of the tested compound protecting 50 percent of the animals from emesis. In Table 1, the $ED_{50}$ values and the long duration of activity of compounds exemplified hereinafter are given.

Another characterization of neuroleptic drugs is their ability to antagonize amphetamine-induced CNS-stimulation. In the amphetamine antagonism test, male Wistar rats are pretreated with an oral dose of the compound to be tested and challenged one hour thereafter with a standard dose of amphetamine (5 mg/kg i.v.). In untreated animals, the standard dose of amphetamine will induce typical CNS-stimulation, e.g., agitation and stereotyped chewing. These phenomena are antagonized by neuroleptic drugs, and, with the subject compounds, such antagonism is observed at oral dose levels of from about 0.05 to about 5.0 mg/kg. The data in Table 1 shows the oral dose levels at which compounds exemplified hereinafter protect the rats against the amphetamine-induced agitation and chewing.

TABLE 1

| Compound of Example | Anti-apomorphine test in dogs (oral) | | Amphetamine antagonism in rats (oral) |
|---|---|---|---|
| | $ED_{50}$ | Duration | $ED_{50}$ |
| I | 0.25 mg/kg | 65 hours | 2.5 mg/kg |
| II | 0.35 mg/kg | 42 hours | 0.63 mg/kg |

The following examples are intended to illustrate, but not to limit, the scope of the present invention. Unless otherwise stated, all parts are by weight.

EXAMPLE I

A mixture of 1.54 parts of 9-(3-chloropropyl)-thioxanthene, 1.16 parts of 1-phenyl-1,3,8-triazaspiro[4,5]decan-4-one, 0.8 parts of anhydrous sodium carbonate, 0.1 parts of potassium iodide and 9.5 parts of dimethylformamide is stirred and heated at 105°C in an oil-bath for 20 hours. The reaction mixture is cooled and water is added. The precipitated product is filtered off, washed with water, dried and recrystallized from acetone, yielding 1-phenyl-8-[3-(9-thioxanthenyl)propyl]-1,3,8-triazaspiro[4,5]decan-4-one; mp. 252.1°C.

EXAMPLE II

A mixture of 2.32 parts of 9-(3-bromopropylidene)-thioxanthene, 3.5 parts of 1-phenyl-1,3,8-triazaspiro[4,5]-decan-4-one, 1.6 parts of sodium carbonate and 20 parts of dimethylformamide is stirred for 3hr.30min. in an oil-bath at 110°–115°C. The reaction mixture is cooled and diluted with water. The whole is stirred for 1hr.30min. at room temperature. The precipitated product is filtered off, washed with water, dried and purified by column-chromatography, using a mixture of chloroform and 10 percent of methanol. The pure fractions are collected and the solvent is evaporated. The residue of 1-phenyl-8-[3-(thioxanthen-9-ylidene)propyl]-1,3,8-triazaspiro[4,5]decan-4-one is converted into the hydrochloride salt in methanol and 2-propanol. The crude salt is filtered off, crystallized from acetone and dried in vacuo at 100°C, yielding 1-phenyl-8-[3-(thioxanthen-9-ylidene)propyl]-1,3,8-triazaspiro-[4,5]decan-4-one hydrochloride; mp. 249.5°–257°C.

We claim:

1. A chemical compound selected from the group consisting of 1-phenyl-8-[3-(9-thioxanthenyl)propyl]-1,3,8-triazaspiro[4,5]decan-4-one; 1-phenyl-8-[3-(thioxanthen-9-ylidene)propyl]-1,3,8-triazaspiro[4,5]-decan-4-one; and the therapeutically active acid addition salts thereof.

2. 1-phenyl-8-[3-(9-thioxanthenyl)propyl]-1,3,8-triazaspiro[4,5]decan-4-one.

3. 1-phenyl-8-[3-(thioxoanthen-9-ylidene)-propyl]-1,3,8-triazaspiro[4,5]decan-4-one.

* * * * *

PO-1050
(5/69)

UNITED STATES PATENT OFFICE
CERTIFICATE OF CORRECTION

Patent No. 3,843,635             Dated October 22, 1974

Inventor(s) Willem Soudijn, et al

It is certified that error appears in the above-identified patent and that said Letters Patent are hereby corrected as shown below:

In Column 2, line 66, "3,579,990 should read -- 3,575,990 ---.

Signed and sealed this 13th day of May 1975.

(SEAL)
Attest:

RUTH C. MASON
Attesting Officer

C. MARSHALL DANN
Commissioner of Patents
and Trademarks